US 12,404,998 B2

(12) United States Patent
Martin et al.

(10) Patent No.: US 12,404,998 B2
(45) Date of Patent: Sep. 2, 2025

(54) SHAPED PART

(71) Applicant: Novem Car Interior Design GmbH, Vorbach (DE)

(72) Inventors: Alexander Martin, Neuhaus an der Pegnitz (DE); Philipp Weih, Haag (DE); Tobias Neuner, Buttenheim (DE); Ilka Roetzer, Kastl (DE)

(73) Assignee: Novem Car Interior Design GmbH (DE)

( * ) Notice: Subject to any disclaimer, the term of this patent is extended or adjusted under 35 U.S.C. 154(b) by 0 days.

(21) Appl. No.: 18/635,302

(22) Filed: Apr. 15, 2024

(65) Prior Publication Data

US 2024/0369215 A1    Nov. 7, 2024

(30) Foreign Application Priority Data

Apr. 18, 2023   (DE) .................. 102023109746.6

(51) Int. Cl.
| | |
|---|---|
| *F21V 23/06* | (2006.01) |
| *B60Q 3/20* | (2017.01) |
| *F21W 106/00* | (2018.01) |
| *F21Y 113/00* | (2016.01) |
| *F21Y 115/10* | (2016.01) |

(52) U.S. Cl.
CPC ............... *F21V 23/06* (2013.01); *B60Q 3/20* (2017.02); *F21W 2106/00* (2018.01); *F21Y 2113/00* (2013.01); *F21Y 2115/10* (2016.08)

(58) Field of Classification Search
CPC .................. B60Q 3/20; F21V 23/06
See application file for complete search history.

(56) References Cited

U.S. PATENT DOCUMENTS

| | | | | |
|---|---|---|---|---|
| 2020/0391475 | A1* | 12/2020 | Weih ........................ | B60Q 3/14 |
| 2024/0004120 | A1* | 1/2024 | Keranen et al. ..... | G02B 6/0055 |
| 2024/0148094 | A1* | 5/2024 | Chiu ........................ | F21V 23/06 |
| 2024/0316899 | A1* | 9/2024 | Martin .................... | B60R 13/02 |
| 2024/0332875 | A1* | 10/2024 | Itschner ............... | H01R 24/005 |

FOREIGN PATENT DOCUMENTS

| | | | | |
|---|---|---|---|---|
| DE | 102022201354 A1 | | 8/2023 | |
| EP | 3150442 A1 * | | 4/2017 | ............ B60R 13/02 |
| EP | 3575153 A1 | | 12/2019 | |
| EP | 3326863 B1 | | 6/2021 | |

* cited by examiner

*Primary Examiner* — Christopher E Dunay
(74) *Attorney, Agent, or Firm* — Workman Nydegger

(57) ABSTRACT

The invention relates to a shaped part comprising a translucent decorative layer with a front side designed as a visible side and a back side opposite the front side, a functional layer arranged on the back side of the decorative layer, and a carrier arranged on a back side of the shaped part. The invention is characterized in that a functional structure is arranged on or in the functional layer and/or on the back side of the decorative layer, wherein the functional structure is, on the one hand, electrically conductive and, on the other, light-conducting for realizing an illumination function of the shaped part.

12 Claims, 1 Drawing Sheet

SHAPED PART

CROSS-REFERENCE TO RELATED APPLICATIONS

The present invention claims priority to German Application 102023109746.6, filed on Apr. 18, 2023. The entire content of each of the aforementioned patent applications is incorporated herein by reference.

BACKGROUND OF THE INVENTION

1. Field of the Invention

The invention relates to a shaped part, in particular a decorative part (also: body trim part) and/or panel part designed as a shaped part for a vehicle interior.

2. The Relevant Technology

Numerous decorative and panel parts are installed in the vehicle interior—for example, door panels, console panels, and instrument panels. The decorative and panel parts also include control buttons and their covers.

The requirements for such shaped parts are continuously increasing; in particular, there is a need for shaped parts with which many optical light effects can be realized on the visible side.

BRIEF SUMMARY OF THE INVENTION

The object of the invention is to provide a new shaped part, in particular a shaped part that enables a light design on the visible side of the shaped part.

This object is achieved by a shaped part having the features of claim 1. Advantageous embodiments and further developments are provided in the dependent claims.

The shaped part according to the invention comprises a translucent decorative layer with a front side designed as a visible side and a back side opposite the front side, a functional layer arranged on the back side of the decorative layer, and a carrier arranged on a back side of the shaped part.

The invention is characterized in that a functional structure is arranged on or in the functional layer and/or on the back side of the decorative layer, wherein the functional structure is designed to be, on the one hand, electrically conductive and, on the other, light-conducting for realizing an illumination function of the shaped part. Thus, the functional structure is both electrically conductive and light-conducting for realizing an illumination function of the shaped part. Thus, the functional structure realizes both functions.

The advantages of the invention lie in particular in the fact that the functional structure fulfills not just a single function, but can be used both as a light guide and as an electrical contact. In this way, additional components and/or production steps can be avoided, which results in more cost-effective solutions. Another advantage is the narrow structure of the shaped part.

It can be provided that the functional structure be formed by conductive tracks, in particular from light-conducting wires. Alternatively, it can be provided that the functional structure be formed by a paste, in particular an electrically conductive and light-conducting paste, and/or a lacquer, in particular an electrically conductive and light-conducting lacquer, and/or a paint, in particular an electrically conductive and light-conducting paint. The paste and/or the lacquer and/or the paint can be made electrically conductive using additives.

The functional structure can also be made at least temporarily self-illuminating, e.g., by adding additives and/or luminescent, in particular fluorescent and/or phosphorescent admixtures. In this context, temporarily is understood in particular to mean that the functional structure is only self-illuminating when activated accordingly, e.g., electrically or optically, e.g., by irradiated visible or non-visible light, and/or following a corresponding activation. In the case of fluorescent admixtures, incident light leads directly to light emission by the admixtures. In the case of phosphorescent admixtures, the energy radiated by the light is at least partially stored by the admixtures and gradually released, even if the incident light has already been switched off again. Thus, the functional structure continues to light up, at least for a certain time, even after the incident light has been switched off.

According to one embodiment variant of the invention, the functional structure forms an intended pattern or symbol, in particular in a top view on the visible side of the shaped part. The symbol can, for example, be one or more functional symbols and/or geometries and/or shapes and/or emblems and/or one or more letters and/or lettering and/or characters and/or logos and, in the case of decorations, for example, lines, in particular lines following a shape, and/or other design elements, which are shown on the visible side of the decorative layer of the shaped part.

The functional structure can be applied to the front side or back side of the functional layer, or to the back of the decorative layer. Furthermore, it can be provided that the functional structure be incorporated into the functional layer, in particular by applying the functional structure to the respective inner front side or back side of a sub-layer of the functional layer.

Furthermore, it can be provided that a layer of flexible material, e.g., of fabric or woven fabric, adjoin the layer to which the functional structure is applied, e.g., the functional layer or the decorative layer, wherein the functional structure presses through the flexible material or presses into it, so that, in particular, a 3-D look is created if the functional structure is self-illuminating.

The functional structure can, for example, be applied to the functional layer or sub-layers of the functional layer or the decorative layer by means of a printing process, such as screen printing or digital printing, and/or by means of a spraying process.

According to a further development of the invention, the shaped part comprises one or more electrical components, wherein the functional structure is provided for connecting the electrical components to an energy source. The energy source can be provided on or in the shaped part. However, it is preferably an external energy source.

The one or more electrical components can be or comprise illumination units, e.g., LED's, and/or heating units and/or sensor units and/or haptic units, in particular for outputting a haptic signal when touched, and/or acoustic units, in particular loudspeakers.

The functional layer is preferably designed to be transparent or translucent. The functional layer can, for example, be a light pane or a diffusing pane (or light-diffusing pane) or a flat light guide or a functional film. The functional layer can be made of a plastic, for example.

Furthermore, it can be provided that the functional layer have a multilayer structure, wherein the functional layer has at least two sub-layers, wherein the functional structure is arranged at an interface between the two sub-layers. Furthermore, the electrical components are preferably arranged at the interface between the two sub-layers.

According to one embodiment variant of the invention, a light-shielding layer, in particular a light-shielding lacquer layer or a mask, is arranged at least in sections on the back side of the functional layer.

Preferably, the shaped part comprises a light source for coupling light into the functional structure, in particular on the back side of the carrier or on the side of the shaped part.

It can be provided that a reflective layer be arranged on the front side of the carrier, wherein the reflective layer preferably reflects light, emanating from the functional structure and/or the electrical components designed as illumination units, in the direction of the visible side of the shaped part.

BRIEF DESCRIPTION OF THE DRAWINGS

The invention is explained in more detail below also with regard to further features and advantages on the basis of the description of exemplary embodiments and with reference to the accompanying schematic drawings. Shown are:

FIG. 1 to FIG. 4 in each case shows a shaped part 10, which comprises a translucent decorative layer 11 with a front side 12 designed as a visible side and a back side 13 opposite the front side 12, a functional layer 15 arranged on the back side 13 of the decorative layer 11, and a carrier 14 arranged on a back side 22 of the shaped part.

DETAILED DESCRIPTION

Figure 1:
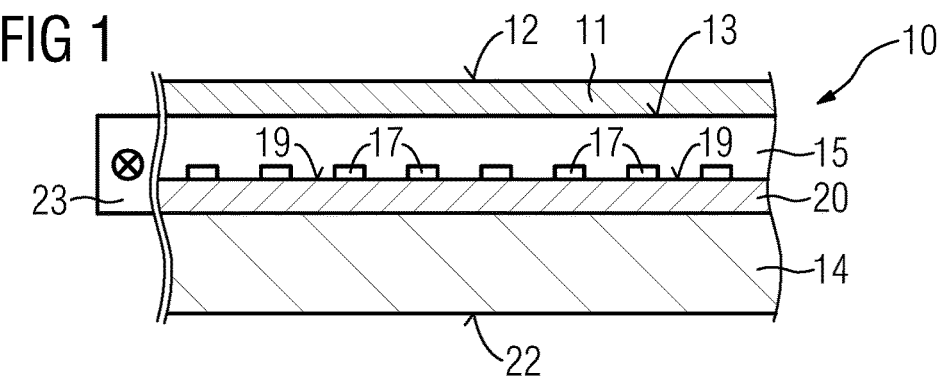
FIG. 1 shows a section of a first shaped part according to the invention, designed as a decorative and/or panel part for the vehicle interior, in a schematic sectional view.

According to the exemplary embodiment according to FIG. 1, a functional structure 17 is arranged on a back side 19 of the functional layer 15, wherein the functional structure 17 is, on the one hand, electrically conductive and, on the other, light-conducting for realizing an illumination function of the shaped part 10. The functional structure 17 can be formed by conductive tracks made of light-conducting wires or by an electrically conductive and light-conducting paste and/or an electrically conductive and light-conducting lacquer and/or an electrically conductive and light-conducting paint. The functional structure 17 is also at least temporarily self-illuminating, e.g., by the addition of additives or luminescent, in particular fluorescent and/or phosphorescent, admixtures. The functional structure 17 is applied to the back side 19 of the functional layer 15 by means of a printing process, e.g., screen printing or digital printing, or by means of a spraying process. In a top view of the visible side of the shaped part 10, the functional structure 17 forms a symbol 21, as shown by way of example in FIG. 4.

The functional layer 15 is designed to be transparent or translucent. A light-shielding lacquer layer 20 is arranged on the back side 19 of the functional layer 15.

The shaped part 10 further comprises a light source 23 on the side of the shaped part 10, wherein light emanating from the light source 23 is coupled into the functional structure 17—for example, in such a way that the functional structure 17 itself lights up.

Figure 2:
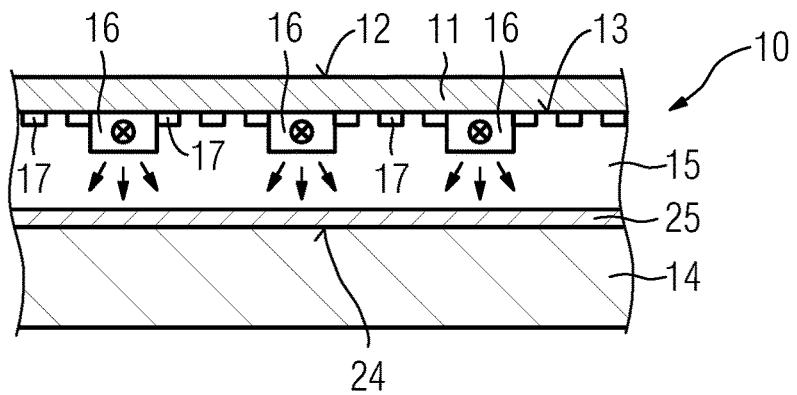
FIG. 2 shows a section of a second shaped part according to the invention, designed as a decorative and/or panel part for the vehicle interior, in a schematic sectional view.

According to the exemplary embodiment according to FIG. 2, the functional structure 17 is arranged on the back side 13 of the decorative layer 11, wherein the functional structure 17 is, on the one hand, electrically conductive and, on the other, light-conducting for realizing an illumination function of the shaped part 10. The functional structure 17 can be formed by conductive tracks made of light-conducting wires or by an electrically conductive and light-conducting paste and/or an electrically conductive and light-conducting lacquer and/or an electrically conductive and light-conducting paint. The functional structure 17 can also be made self-illuminating, at least temporarily—for example by adding additives or fluorescent admixtures. The functional structure 17 is applied to the back side 13 of the decorative layer 11 by means of a printing process, e.g., screen printing or digital printing, or by means of a spraying process.

The shaped part 10 according to the exemplary embodiment according to FIG. 2 also comprises several electrical components 16, wherein the functional structure 17 is provided for connecting the electrical components 16 to an energy source. The energy source can be arranged on or in the shaped part 10, but is preferably an external energy source. The electrical components 16 are also arranged on the back side 13 of the decorative layer 11 and are at least partially embedded in the functional layer 15. The electrical components 16 according to the exemplary embodiment according to FIG. 2 are illumination units, preferably LED's. However, the electrical components 16 can also be heating units, sensor units, haptic units for emitting a haptic signal when touched, or acoustic units such as loudspeakers.

The functional layer 15 is designed to be transparent or translucent. A reflective layer 25 is arranged on a front side 24 of the carrier 14, wherein the reflective layer 25 reflects light, emanating from the functional structure 17 and/or the electrical components 16 designed as illumination units, in the direction of the visible side of the shaped part 10.

Figure 3:
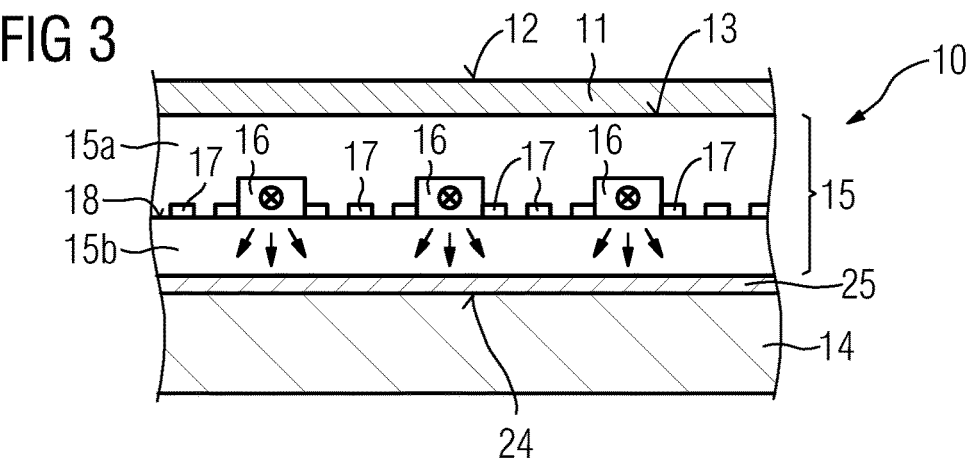
FIG. 3 shows a section of a third shaped part according to the invention, designed as a decorative and/or panel part for the vehicle interior, in a schematic sectional view.

According to the exemplary embodiment according to FIG. 3, the functional structure 17 is arranged in the functional layer 15, wherein the functional structure 17 is, on the one hand, electrically conductive and, on the other, light-conducting for realizing an illumination function of the shaped part 10. The functional structure 17 can be formed by conductive tracks made of light-conducting wires or by an electrically conductive and light-conducting paste. The functional structure 17 can also be made at least temporarily self-illuminating, e.g., by adding additives or luminescent, in particular fluorescent and/or phosphorescent admixtures.

The functional layer 15 is designed to be transparent or translucent, on the one hand, and has a multilayer structure, on the other, wherein the functional layer 15 has two sub-layers 15a, 15b, wherein the functional structure 17 is arranged at an interface 18 between the two sub-layers 15a, 15b. The functional structure 17 is incorporated into the functional layer 15 by applying the functional structure 17 to the respective inner front side or back side of a sub-layer 15a, 15b of the functional layer 15 before the second sub-layer 15a, 15b is added. The functional structure 17 can be applied to the respective sub-layer 15a, 15b by means of a printing process—for example, screen printing or digital printing.

The shaped part 10 according to the exemplary embodiment according to FIG. 3 further comprises several electrical components 16, wherein the functional structure 17 is provided for connecting the electrical components 16 to an energy source. The electrical components 16 are arranged at the interface 18 between the two sub-layers 15a, 15b of the functional layer 15 and are thus also embedded in the functional layer 15. The electrical components 16 according to the exemplary embodiment according to FIG. 2 are illumination units, preferably LED's.

A reflective layer 25 is arranged on the front side 24 of the carrier 14, wherein the reflective layer 25 reflects light, emanating from the functional structure 17 and the electrical components 16, which are designed as illumination units, in the direction of the visible side of the shaped part 10.

Figure 4:
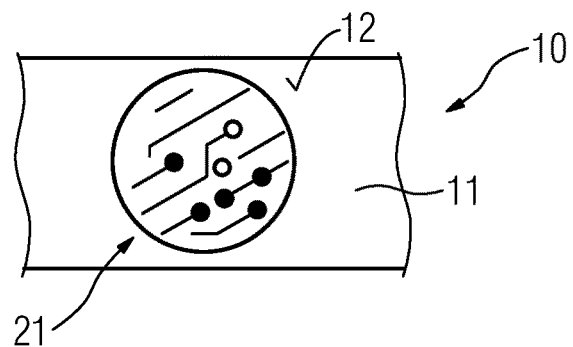
FIG. 4 shows a section of a fourth shaped part according to the invention, designed as a decorative and/or panel part for the vehicle interior, in a schematic sectional view.

FIG. 4 shows a top view of a section of a shaped part 10 designed as a decorative and/or panel part for the vehicle interior. In a top view of the visible side of the shaped part 10, the functional structure 17 forms a symbol 21. FIG. 4 shows an exemplary symbol 21. The symbol 21 can, for example, be one or more functional symbols and/or geometries and/or shapes and/or one or more letters and/or lettering and/or characters and, in the case of decorations, e.g., lines, in particular lines following a shape, and/or other design elements, which are shown on the visible side of the decorative layer 11 of the shaped part 10.

LIST OF REFERENCE SIGNS

10 Shaped part
11 Decorative layer
12 Front side
13 Back side
14 Carrier
15 Functional layer
15a Sub-layer
15b Sub-layer
16 Electrical component
17 Functional structure
18 Interface
19 Back side (functional layer)
20 Light-shielding layer
21 Symbol
22 Back side (shaped part)
23 Light source
24 Front side (carrier)
25 Reflective layer

We claim:
1. Shaped part, comprising
a translucent decorative layer with a front side designed as a visible side and a back side opposite the front side,
a functional layer arranged on the back side of the decorative layer, wherein the functional layer comprises a transparent or translucent layer, and
a carrier arranged on a back side of the shaped part, wherein:
a functional structure is arranged on or in the functional layer and/or on the back side of the decorative layer, wherein the functional structure is electrically conductive and at the same time light-conducting for realizing an illumination function of the shaped part;
wherein:
the shaped part comprises one or more electrical components, wherein the functional structure is configured for connecting the electrical components to an energy source,
the shaped part comprises a light source for coupling light into the functional structure, and
the functional structure is formed by one or more of a paste, a lacquer, or a paint.

2. Shaped part according to claim 1, wherein:
the functional structure is formed by conductive tracks, or
that the functional structure is formed by a paste and/or a lacquer and/or a paint.

3. Shaped part according to claim 1, wherein:
the functional structure is at least temporarily self-illuminating.

4. Shaped part according to claim 3, wherein:
the functional structure is self-illuminating, at least temporarily, by adding additives and/or luminescent admixtures.

5. Shaped part according to claim 1, wherein:
the functional structure forms an intended pattern or symbol.

6. Shaped part according to claim 1, wherein:
the functional structure is applied to the back side of the decorative layer.

7. Shaped part according to claim 1, wherein:
the functional structure is applied to the functional layer or the decorative layer by means of a printing process and/or by means of a spraying process.

8. Shaped part according to claim 1, wherein:
the shaped part comprises one or more electrical components, wherein the functional structure is provided for connecting the electrical components to an energy source.

9. Shaped part according to claim 8, wherein:
the one or more electrical components are or comprise illumination units and/or heating units and/or sensor units and/or haptic units and/or acoustic units.

10. Shaped part according to claim 1, wherein:
the functional layer is designed to be transparent or translucent.

11. Shaped part according to claim 1, wherein:
a light-shielding layer is arranged at least in sections on a back side of the functional layer.

12. Shaped part according to claim 1, wherein:
a reflective layer is arranged on a front side of the carrier.

* * * * *